US008728573B2

(12) United States Patent
Wang et al.

(10) Patent No.: US 8,728,573 B2
(45) Date of Patent: May 20, 2014

(54) METAL COMPOUND COATED PARTICULATE MINERAL MATERIALS, METHODS OF MAKING THEM AND USES THEREOF

(71) Applicant: Imerys Filtration Minerals, Inc., San Jose, CA (US)

(72) Inventors: Bo Wang, Lompoc, CA (US); Michael Greene, Santa Barbara, CA (US)

(73) Assignee: Imerys Filtration Minerals, Inc., San Jose, CA (US)

( * ) Notice: Subject to any disclaimer, the term of this patent is extended or adjusted under 35 U.S.C. 154(b) by 42 days.

(21) Appl. No.: 13/653,866

(22) Filed: Oct. 17, 2012

(65) Prior Publication Data

US 2013/0081556 A1 Apr. 4, 2013

Related U.S. Application Data

(62) Division of application No. 12/531,904, filed as application No. PCT/US2008/057957 on Mar. 22, 2008, now abandoned.

(60) Provisional application No. 60/896,506, filed on Mar. 23, 2007.

(51) Int. Cl.
*B32B 5/16* (2006.01)
*B32B 19/00* (2006.01)
*C04B 14/00* (2006.01)
*C08K 3/00* (2006.01)

(52) U.S. Cl.
USPC .......................................... 427/212; 427/219

(58) Field of Classification Search
CPC ............ B01J 2/006; E04D 7/005; B32B 5/16; B32B 19/00; C04B 14/00; C08K 3/00
USPC .................................. 427/212, 219
See application file for complete search history.

(56) References Cited

U.S. PATENT DOCUMENTS 2,583,292 A * 1/1952 Bowen et al. ................. 264/128
3,030,215 A 4/1962 Veatch et al.
(Continued)

FOREIGN PATENT DOCUMENTS

JP 57145063 A 9/1982
WO WO 2008/118827 A1 10/2008

OTHER PUBLICATIONS

International Search Report and Written Opinion issued Jun. 27, 2008, for International Application No. PCT/US2008/057957.

*Primary Examiner* — Timothy Meeks
*Assistant Examiner* — Ann DiSarro
(74) *Attorney, Agent, or Firm* — Finnegan, Henderson, Farabow, Garrett & Dunner, L.L.P.

(57) ABSTRACT

Particulate mineral materials comprising at least one coating comprising at least one metal compound are disclosed. In one embodiment, the at least one metal compound is a metal silicate compound. In another embodiment, the at least one metal compound is a metal oxide compound. In one embodiment, the particulate mineral material is perlite. In another embodiment, the particulate mineral material is perlite microspheres. In a further embodiment, the particulate mineral material is diatomite. Methods of making particulate mineral materials coated with at least one metal compound are also disclosed. In one embodiment, the at least one metal compound may be injected into a perlite expander to form a metal compound coated perlite material. In another embodiment, the at least one metal compound may be applied through a low temperature coating process to the at least one particulate mineral material. Uses for metal compound coated particulate mineral materials are also disclosed.

21 Claims, 8 Drawing Sheets

(56) References Cited

U.S. PATENT DOCUMENTS

| | | |
|---|---|---|
| 3,769,065 A | 10/1973 | Dunn |
| 3,849,149 A | 11/1974 | Swift et al. |
| 3,961,978 A | 6/1976 | Brodmann |
| RE30,568 E | 4/1981 | Fitton |
| 4,328,040 A | 5/1982 | Panek et al. |
| 4,432,798 A | 2/1984 | Helferich et al. |
| 4,443,258 A | 4/1984 | Kirkhuff |
| 4,677,022 A | 6/1987 | Dejaiffe |
| 5,304,526 A | 4/1994 | Laine et al. |
| 5,352,287 A | 10/1994 | Wason et al. |
| 5,397,759 A | 3/1995 | Torobin |
| 5,540,793 A | 7/1996 | Bals et al. |
| 6,302,835 B1 | 10/2001 | Davis et al. |
| 6,333,072 B1 | 12/2001 | Lane et al. |
| 6,531,222 B1 | 3/2003 | Tanaka et al. |
| 6,641,908 B1 | 11/2003 | Clough |
| 2003/0039771 A1 | 2/2003 | Hachitani et al. |
| 2006/0177661 A1 | 8/2006 | Smith et al. |
| 2007/0144736 A1 | 6/2007 | Shinbach et al. |

* cited by examiner

METAL COMPOUND COATED PARTICULATE MINERAL MATERIALS, METHODS OF MAKING THEM AND USES THEREOF

CLAIM OF PRIORITY

This is a divisional of U.S. application Ser. No. 12/531,904, filed Sep. 18, 2009, which is a national stage entry under 35 U.S.C. §371 and claims the benefit of priority of PCT International Application No. PCT/US2008/057957, filed Mar. 22, 2008, which claims the benefit of priority of U.S. Provisional Application No. 60/896,506 filed Mar. 23, 2007, the disclosures of all of which are incorporated herein by reference.

FIELD OF THE INVENTION

Disclosed herein are particulate mineral materials coated with at least one metal compound. In one embodiment, the at least one metal compound is a metal silicate compound. In another embodiment, the at least one metal compound is a metal oxide compound. Also disclosed herein are methods of making particulate mineral materials coated with at least one metal compound, as well as various uses for metal-compound coated particulate mineral materials.

BACKGROUND OF THE INVENTION

Particulate mineral materials find use in a variety of different applications including, but not limited to, coatings, pigments, fillers, proppants, catalysts, extenders, inert carriers, for filtration, for insulations, and for horticultural applications. One example of a particulate mineral material is perlite. Perlite is a naturally occurring siliceous volcanic glass rock, generally distinguishable from other volcanic glasses due to its expansion from about four to about twenty times its original volume when heated to a temperature within its softening range. Perlite particles have been found to be useful in an array of applications, such as those mentioned above, both in their expanded and in their unexpanded form.

The expanded form of perlite may be achieved due in part to the presence of water trapped within the crude perlite glass rock. When perlite is quickly heated, the water vaporizes, creating bubbles in the heat-softened glassy particles and generally resulting in a light-weight, chemically inert, highly expanded perlite product. An expanded perlite product may be manufactured to weigh from, for example, about 2 pds/ft$^3$ to about 15 pds/ft$^3$, allowing it to be adapted for numerous uses, such as those previously described.

The final form and grade of an expanded perlite product may be controlled by, among other things, changing the heating cycle within a perlite expander, altering the size profile of an unexpanded perlite feed material by milling, or other processes now known to those of skill in the art or hereafter discovered. In one expanded form, the perlite particles are aggregate particles. In another expanded form, the perlite particles are solid microspheres. In a further expanded form, the perlite particles are porous microspheres. Expanded perlite in the form of porous microspheres has, in general, fewer inner cells compared to the relatively larger number of inner cells found in the more commonly produced expanded perlite aggregate particles.

Perlite may additionally be milled after it is expanded. Expanded perlite that has not been subsequently milled generally has a foamy or bubbly structure and may include porous spheres. When expanded perlite is subsequently milled, the bubbles in the structure are generally crushed, resulting in bubble fragments that are smaller and generally of a platy structure.

Another example of a particulate mineral material is diatomaceous earth (also called "DE" or "diatomite"), which is generally regarded as a sediment enriched in biogenic silica (i.e., silica produced or brought about by living organisms) in the form of siliceous skeletons (frustules) of diatoms. Diatoms are a diverse array of microscopic, single-celled, golden-brown algae of the class Bacillariophyceae that possess an ornate siliceous skeleton of varied and intricate structures comprising two valves that, in the living diatom, fit together much like a pill box. In one embodiment, the diatomaceous earth is freshwater diatomite. In another embodiment, the diatomaceous earth is saltwater diatomite.

In some applications, the compressive strength, hardness, and/or color of the particulate mineral materials may play an important roll in fulfilling their intended purpose. It has been known in the art to improve certain attributes of particulate mineral materials through surface coating or binding particles together. U.S. Pat. No. 3,849,149 to Swift et al., for example, appears to disclose a method of modifying the surface properties of certain particulate mineral materials with a surface coating having a significant number of acidic sites with pKa values less than 2.8, so as to result in greater ease of incorporation and uniformity of dispersion in pigment and filler end uses. As another example, U.S. Pat. No. 4,432,798 to Helferich et al. appears to disclose moldable, self-setting composition consisting of a granular or particulate aggregrate held together by an alkali-aluminosilicate binder hydrogel. As a further example, U.S. Pat. No. 5,352,287 to Wason et al. appears to disclose a composite pigment product that comprises a mineral nucleus coated with a substantially continuous and uniform active paper pigment coating, which may be used to enhance the opacity, brightness, and/or optical performance characteristics of paper. As another example, U.S. Pat. No. 6,641,908 B1 to Clough appears to disclose inorganic substrate materials comprising a metal oxide coating that may be formed by high temperature plasma coating.

The present inventors have unexpectedly discovered that, by coating particulate mineral materials with at least one metal compound, the compressive strength, hardness, and/or color of those materials may be improved. In one embodiment, the at least one metal compound is a metal oxide compound. In another embodiment, the at least one metal compound is a metal silicate compound. None of the references mentioned above appear to teach or suggest at least the following: (1) the use of at least one metal silicate coating to improve the compressive strength, hardness, and/or coloration of at least one particulate mineral material; (2) the application of at least one zirconium or zinc silicate coating onto at least one diatomite particulate mineral material; (3) the application of at least one aluminosilicate coating onto at least one perlite particulate mineral material; and (4) the coating of at least one particulate mineral material with a metal oxide coating, by use of low (e.g., room) temperature solution coating.

SUMMARY OF THE INVENTIONS

Disclosed herein are metal silicate coated particulate mineral materials comprising perlite comprising a coating comprising at least one metal silicate.

Also disclosed herein are metal silicate coated particulate mineral materials comprising diatomite comprising a coating comprising at least one metal silicate selected from at least one of zirconium silicates and zinc silicates.

Also disclosed herein are metal silicate coated particulate mineral materials comprising a particulate perlite microsphere comprising a coating comprising at least one metal silicate.

Also disclosed herein are methods of forming coated expanded perlite microspheres, comprising: introducing perlite microspheres into an expander heated to a temperature of from about 900° F. to about 1100° F.; injecting into the expander at least one metal silicate; and, allowing the perlite microspheres and the at least one metal silicate to reside in the expander for a time sufficient to coat the perlite microspheres with the at least one metal silicate.

Also disclosed herein are methods of forming coated expanded perlite microspheres, comprising: introducing perlite microspheres into an expander heated to a temperature of from about 900° F. to about 1100° F.; injecting into the expander at least one metal compound and at least one silicate compound; and, allowing the perlite microspheres, the at least one aluminum compound, and the at least one silicate compound to reside in the expander for a time sufficient to coat the perlite microspheres with the at least one metal compound and the at least one silicate compound, wherein the at least one metal compound and the at least one silicate compound form at least one metal silicate.

Also disclosed herein are coating, catalyst, pigment, filler, proppant, or extender products comprising perlite comprising a coating comprising at least one metal silicate.

Also disclosed herein are coating, catalyst, pigment, filler, proppant, or extender products comprising diatomite comprising a coating comprising at least one metal silicate selected from at least one of zirconium silicates and zinc silicates.

Also disclosed herein are coating, catalyst, pigment, filler, proppant, or extender products comprising at least one particulate microsphere mineral material comprising a coating comprising at least one metal silicate.

Also disclosed herein are methods of applying at least one metal oxide coating to at least one particulate mineral material comprising solution coating at about room temperature.

Also disclosed herein are methods of increasing the brightness of at least one particulate mineral material, comprising applying by low temperature solution coating at least one coating of at least one metal oxide compound to the at least one particulate mineral material, wherein the b value of the at least one particulate mineral material decreases by about 1 unit.

Also disclosed herein are methods of increasing the compressive strength of at least one particulate mineral material, comprising applying at least one coating of at least one metal silicate to the at least one particulate mineral material, wherein the compressive strength as measured by compaction resistance increases at least about two times.

Also disclosed herein are methods of increasing the hardness of at least one particulate mineral material, comprising applying at least one coating of at least one metal silicate to the at least one particulate mineral material, wherein the hardness as measured by scrub resistance increases by at least about two percent.

DETAILED DESCRIPTION OF THE INVENTION

Particulate Mineral Materials

Figure 1:
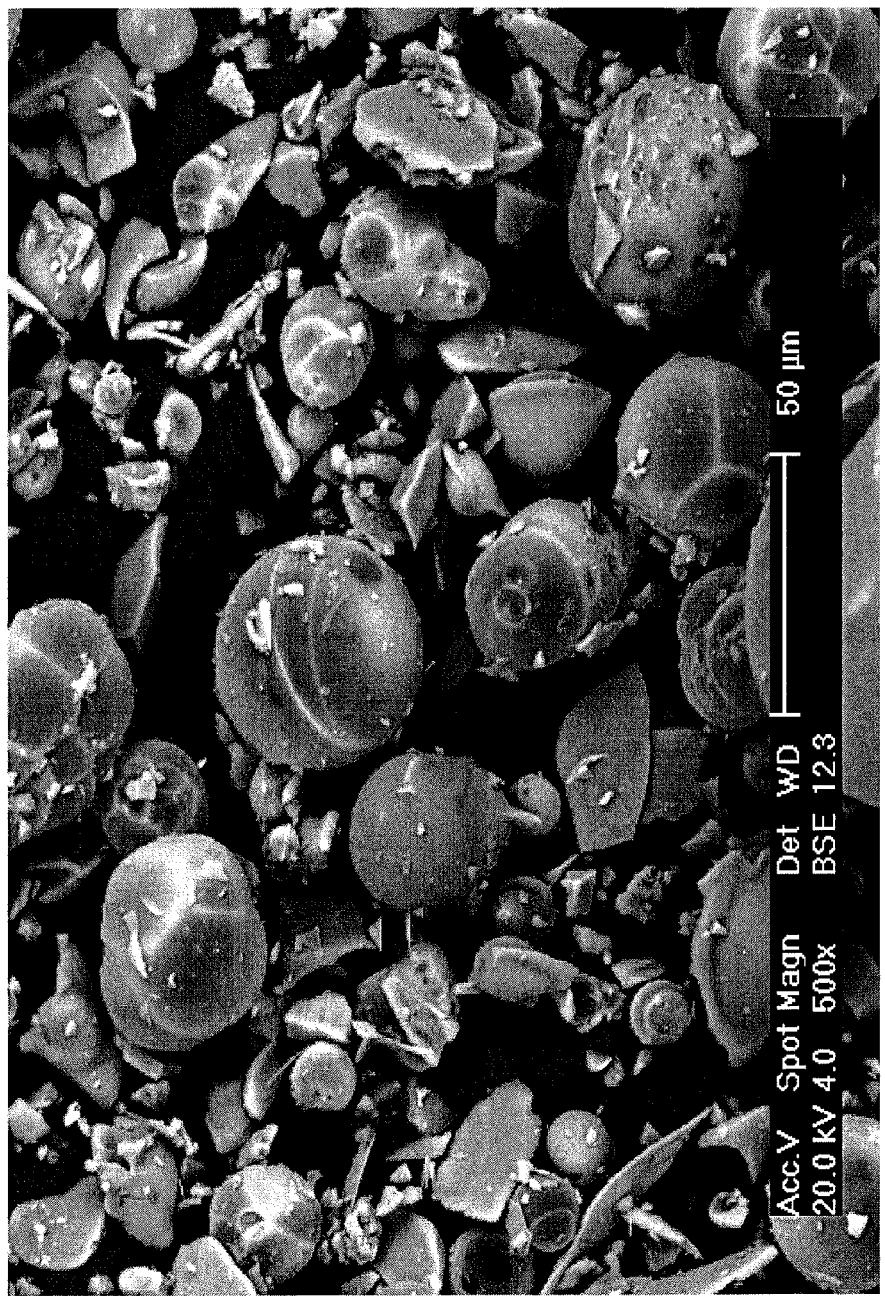
FIG. 1 is a scanning electron micrograph of expanded perlite microspheres.
Figure 2:
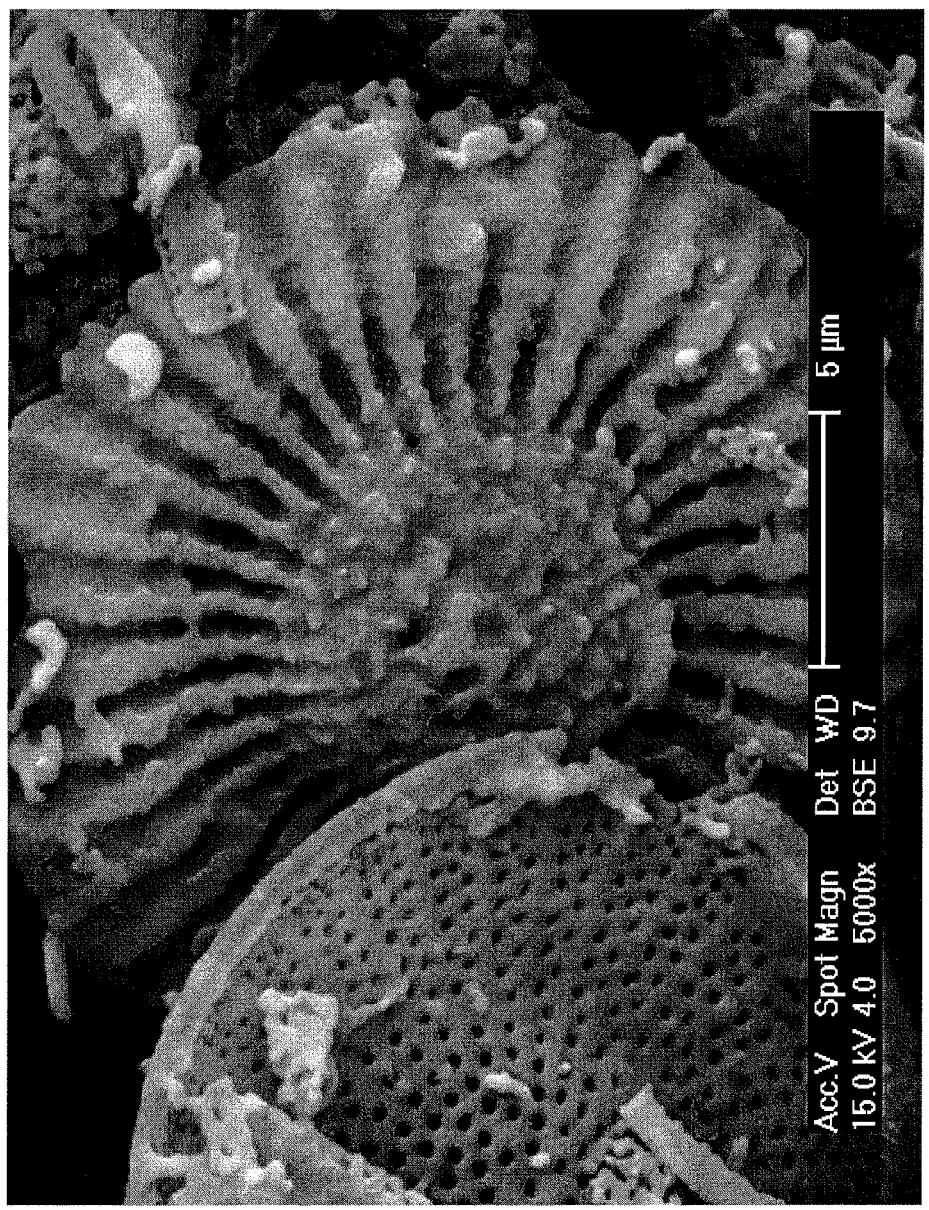
FIG. 2 is a scanning electron micrograph of an exemplary zirconium silicate coated diatomaceous earth sample in accordance with the present invention.
Figure 3:
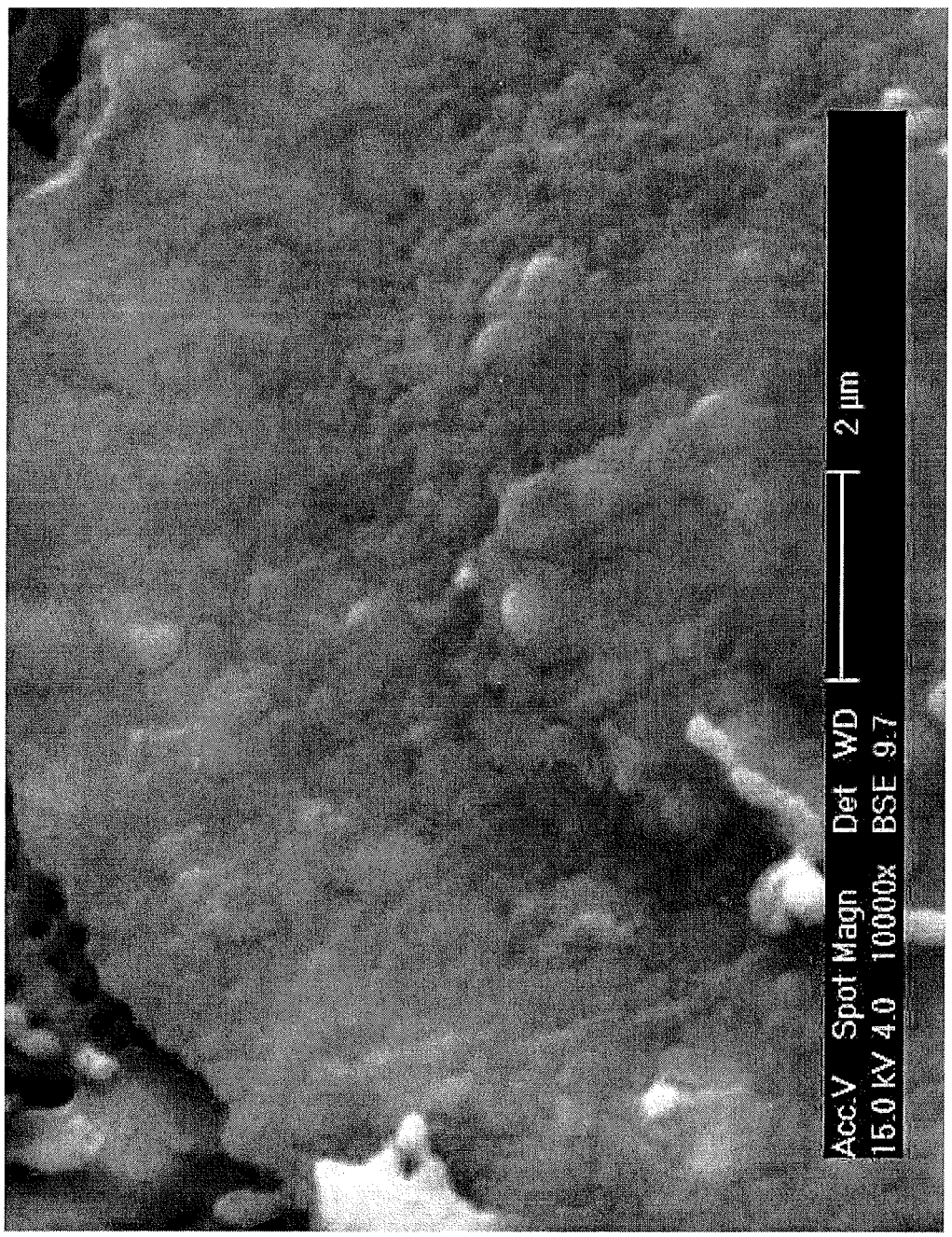
FIG. 3 is another scanning electron micrograph of an exemplary zirconium silicate coated diatomaceous earth sample in accordance with the present invention.
Figure 4:
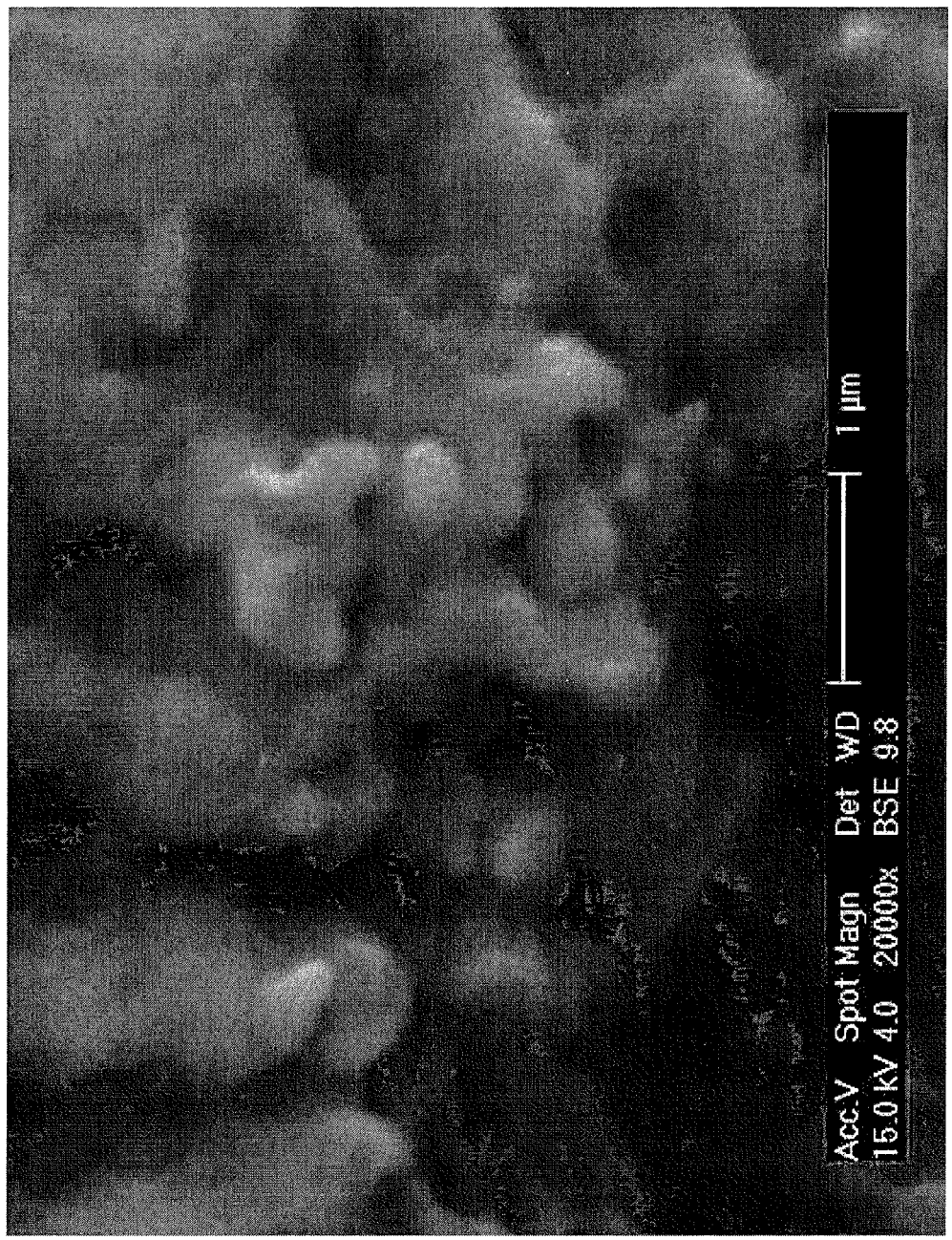
FIG. 4 is another scanning electron micrograph of an exemplary zirconium silicate coated diatomaceous earth sample in accordance with the present invention.
Figure 5:
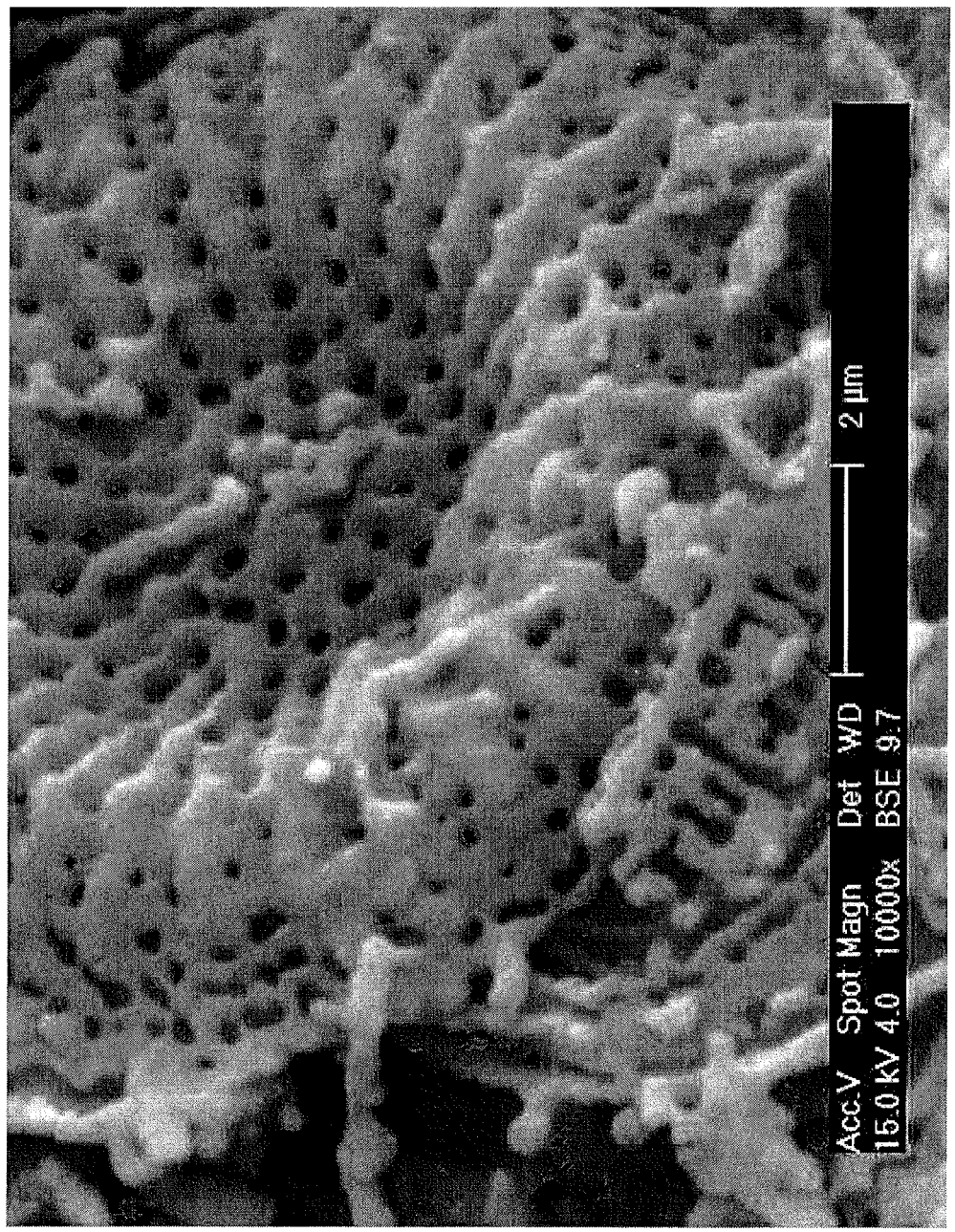
FIG. 5 is another scanning electron micrograph of an exemplary zirconium silicate coated diatomaceous earth sample in accordance with the present invention.
Figure 6:
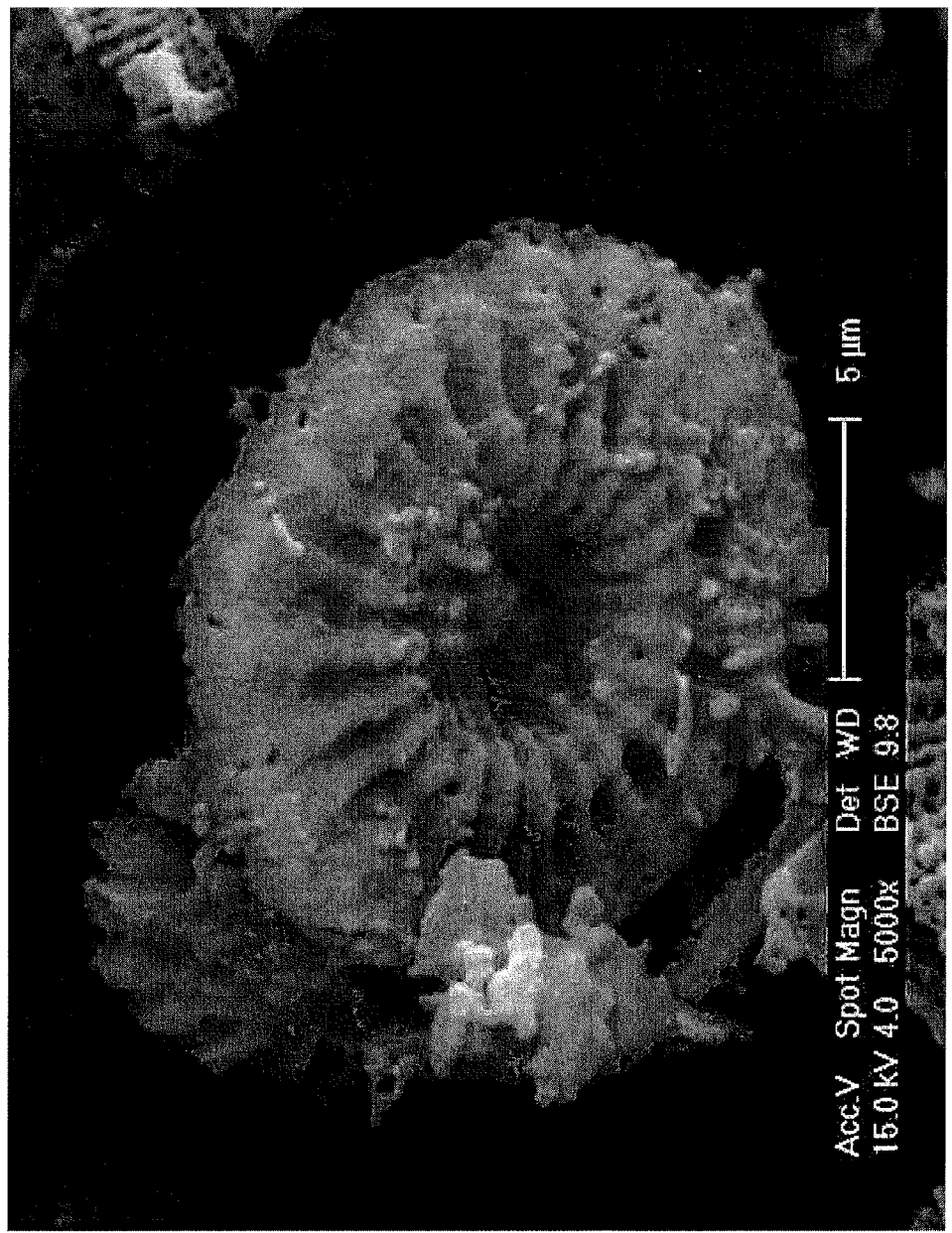
FIG. 6 is another scanning electron micrograph of an exemplary zirconium silicate coated diatomaceous earth sample in accordance with the present invention.

The at least one particulate mineral material is a naturally occurring or manufactured mineral material capable of receiving at least one coating comprising at least one metal compound. Those of skill in the art will understand appropriate at least one particulate mineral materials for use in accordance with the present invention. The at least one particulate mineral material may be of one or more varying properties, e.g., composition, form, shape, size, and/or density. In one embodiment, the at least one particulate mineral material is any particulate mineral material that could benefit from an increase in compressive strength. In another embodiment, the at least one particulate mineral material is any particulate mineral material that could benefit from an increase in hardness. In a further embodiment, the at least one particulate mineral material is any particulate mineral material that could benefit from improved coloration. In yet another embodiment, the at least one particulate mineral material is any particulate mineral material that could benefit from improved scrub resistance.

A non-limiting list of at least one particulate mineral materials contemplated for use with the present invention includes perlite, diatomite, pumice, vermiculite, obsidian, kaolin, bauxite, bauxitic kaolin, calcium carbonate, talc, mica, oxide pigments, silica, alumina, zirconia, sintered bauxite, andalusite, feldspar, nepheline syenite, colorants, and particulate glasses including but not limited to soda lime, borosilicate, calcium aluminum silicate (E-Glass), and recycled-post consumer glass. In one embodiment, the at least one particulate mineral material is perlite. In another embodiment, the at least one particulate mineral material is diatomite. In a further embodiment, the at least one particulate mineral material is calcium carbonate. In yet another embodiment, the at least one particulate mineral material is kaolin.

The at least one particulate mineral material may be in any suitable form, including but not limited to amorphous, spherical, non-spherical, micron scale, non-micron scale, microspherical, porous, solid, non-expanded, expanded, and milled. As used herein, the term "microsphere" refers to a sphere or spherical material that is micron in scale. As used herein, the term "solid" refers to a particulate mineral material having a theoretical density of greater than or equal to about 90%. As used herein, the term "hollow" or "porous" refers to a particulate mineral material having a theoretical density of less than about 90%. As used herein, the terms "sphere" or "spherical" refer to a particle that, when magnified as a two-dimensional image, generally appears rounded and generally free of sharp corners or edges, whether or not the particle appears to be truly or substantially circular, elliptical, globular, or any other rounded shape; thus, in addition to the truly circular and elliptical shapes, other shapes with curved but not circular or elliptical outlines are included as a "sphere" or as "spherical". A particulate mineral material may also be considered a "sphere" or as "spherical" even though it may have some individual particles that have agglomerated, thereby forming non-spherical agglomerates in the otherwise spherical material, or are otherwise non-spherical.

The at least one particulate mineral material may be of any shape selected by the skilled artisan for the intended purpose. In one embodiment, the at least one particulate mineral material is amorphous. In another embodiment, the at least one particulate mineral material is spherical. In yet another embodiment, the at least one particulate mineral material is in the shape of solid microspheres. In yet a further embodiment, the at least one particulate mineral material is in the shape of porous microspheres. In still another embodiment, the at least one particulate mineral material is in the shape of hollow microbubbles. In still a further embodiment, the at least one particulate mineral material is in the shape of hollow beads. In another embodiment, the at least one particulate mineral material is in the shape of hollow voids. In a further embodiment, the at least one particulate mineral material is perlite in the shape of solid microspheres. In yet another embodiment, the at least one particulate mineral material is perlite in the shape of porous microspheres.

The at least one particulate mineral material may be of any size selected by the skilled artisan for the intended purpose. In one embodiment, the at least one particulate mineral material is micron scale. In another embodiment, the at least one particulate mineral material is non-micron scale. As used herein, the prefix "micro" and the term "micron scale" both refer to a particulate mineral material having an equivalent spherical diameter of less than 100 μm, while the prefix "non-micron scale" refers to a particulate mineral material having an equivalent spherical diameter equal to or greater than 100 μm. As used herein, a particulate mineral material may be considered "micron scale" even though it may have some individual particles that have agglomerated, thereby forming non-micron scale agglomerates in the otherwise micron scale material, or are otherwise non-micron scale.

In one embodiment, the at least one particulate mineral material has an equivalent spherical diameter of less than about 10 mm. In another embodiment, the at least one particulate mineral material has an equivalent spherical diameter (esd) of less than about 5 mm. In a further embodiment, the at least one particulate mineral material has an esd of less than about 1 mm. In yet another embodiment, the at least one particulate mineral material has an esd of less than about 100 μm. In yet a further embodiment, the at least one particulate mineral material has equivalent spherical diameter of less than about 10 μm. In still another embodiment, the at least one particulate mineral material has an equivalent spherical diameter of less than about 1 μm.

In one embodiment, the at least one particulate mineral material has an esd from about 0.5 μm to about 10 mm. In another embodiment, the at least one particulate mineral material has an esd from about 1 μm to about 5 mm. In a further embodiment, the at least one particulate mineral material has an esd from about 1 μm to about 1 mm. In still another embodiment, the at least one particulate mineral material has an esd from about 10 μm to about 100 μm.

The equivalent spherical diameter of a particulate mineral material may be measured using any of a variety of methods now known or hereafter discovered. For example, esd may be measured using SEDIGRAPH particle size analyzer. Esd analysis may also yield information such as a $d_{10}$ (the size at which 10 percent of the particle volume is accounted for by particles having a diameter less than or equal to the specified value), $d_{50}$ (same as $d_{10}$ but for 50 percent particle volume, as called average particle size), and $d_{90}$ (same as $d_{10}$ but for 90 percent particle volume).

In one embodiment, the at least one particulate mineral material is perlite. In another embodiment, the at least one particulate mineral material is non-expanded perlite. In a further embodiment, the particulate mineral material is expanded perlite. In yet another embodiment, the particulate mineral material is expanded perlite that has been subsequently milled. In yet a further embodiment, the particulate mineral material is perlite in the form of non-expanded microspheres. In still another embodiment, the particulate mineral material is perlite in the form of expanded microspheres. In still a further another embodiment, the particulate mineral material is perlite in the form of expanded microspheres that have been subsequently milled.

In one embodiment, the at least one particulate mineral material is diatomite. In another embodiment, the diatomite is saltwater diatomite. In a further embodiment, the diatomite is freshwater diatomite. In one embodiment, the diatomite is calcined. In another embodiment, the diatomite is flux calcined. In another embodiment, the diatomite is natural (e.g., not calcined).

Metal Compounds

The at least one particulate mineral material is coated with at least one coating comprising at least one metal compound, such that after at least one coating process the at least one particulate mineral material comprises at least one coating comprising at least one metal compound. In one embodiment, the at least one metal compound comprises at least one metal component and at least one other component chosen from the group consisting of oxide components and silicate components. The separate component materials may also be called starting materials and the at least one metal compound may be formed from many different starting materials by many different processes. In one embodiment, the at least one metal compound comprises at least one metal component and at least one silicate component. In another embodiment, the at least one metal compound comprises at least one metal component and at least one oxide component.

The at least one metal component comprises at least one metal now known to the skilled artisan or hereafter discovered. Semimetals or metalloids, such as boron and silicon, are contemplated as at least one metals within the scope of the present inventions. A non-limiting list of at least one metals contemplated for use with the present invention includes aluminum, copper, chromium, copper, iron, lead, nickel, silver, titanium, zinc, zirconium, boron, silicon, and mixtures thereof. In one embodiment, the at least one metal is aluminum. In another embodiment, the at least one metal is zinc. In a further embodiment, the at least one metal is zirconium. In yet another embodiment, the at least one metal is boron. In yet a further embodiment, the at least one metal component is chosen from the group consisting of metal nitrates, metal sulfates, metal aluminates, sodium metals, metal chlorides, metal alkoxides, metal acetates, metal formates, bayerite, pseudoboehmite, gibbsite, colloidal metals, metal gels, metal sols, metal trichlorides, ammonium metal carbonates, metal hydrates, and metal chlorohydrates.

In one embodiment, the at least one metal component is at least one aluminum compound. Examples of the at least one aluminum compound include, but are not limited to, aluminum salts, aluminum nitrate, aluminum sulfate, alkali aluminate, sodium aluminate, aluminum halides (such as aluminum chloride), aluminum alkoxide, aluminum acetate, aluminum formate, bayerite, pseudoboehmite, gibbsite, colloidal alumina, alumina gel, alumina sol, aluminum trichloride, ammonium aluminum carbonate, and aluminum chlorohydrate. In one embodiment, the at least one aluminum compound is aluminum nitrate. In another embodiment, the at least one aluminum compound is aluminum sulfate. In a further embodiment, the at least one aluminum compound is sodium aluminate. In yet another embodiment, the at least one aluminum compound is aluminum chloride.

In another embodiment, the at least one metal component is at least one zirconium compound. Examples of the at least one zirconium compound include, but are not limited to, zirconium nitrate, zirconium sulfate, alkali zirconia, sodium zirconia, zirconium chloride, zirconium alkoxide, zirconium acetate, zirconium formate, colloidal zirconia, zirconium gel, zirconium sol, zirconium trichloride, ammonium zirconium carbonate, and zirconium chlorohydrate. In one embodiment, the at least one zirconium compound is zirconium sulfate. In another embodiment, the at least one zirconium compound is zirconium chloride. In a further embodiment, the at least one zirconium compound is ammonium zirconium carbonate.

In a further embodiment, the at least one metal component is at least one zinc compound. Examples of the at least one zinc compound include, but are not limited to, zinc nitrate, zinc sulfate, alkali zincs, sodium zincs, zinc chloride, zinc alkoxide, zinc acetate, zinc formate, colloidal zincs, zinc gel, zinc sol, zinc trichloride, and zinc chlorohydrate. In one embodiment, the at least one zinc compound is zinc nitrate. In another embodiment, the at least one zinc compound is zinc sulfate.

In yet another embodiment, the at least one metal compound is at least one boron compound. In one embodiment, the at least one metal compound is ammonium pentaborate octahydrate.

In one embodiment, the at least one metal compound is formed in the presence of at least one acid. Without wishing to be bound by theory, it is believed that at least one acid may act to facilitate precipitation or coating of the at least one metal compound onto the at least one particulate mineral material. Appropriate acids will be known or may be hereafter discovered by the skilled artisan. Examples of the at least one acid include, but are not limited to, hydrochloric acid, sulfuric acid, phosphoric acid, formic acid, and acetic acid. In one embodiment, the at least one acid is hydrochloric acid. In another embodiment, the at least one acid is phosphoric acid.

In one embodiment, the at least one metal compound comprises at least one metal component and at least one silicate component. Exemplary embodiments of the at least one silicate component include, but are not limited to, tetraethylorthosilicate (TEOS), tetramethylorthosilicate (TMOS), sodium silicate, alkali silicate, colloidal silica, solid silica, alkaline metal silicates, and sodium metasilicate. In one embodiment, the at least one silicate component is TEOS. In another embodiment, the at least one silicate component is sodium silicate.

In one embodiment, the at least one metal compound is at least one alumino silicate. In one embodiment, the starting materials for the at least one alumino silicate comprise TEOS and aluminum nitrate. In another embodiment, the starting materials for the at least one alumino silicate comprise sodium silicate and aluminum sulfate. In a further embodiment, the at least one alumino silicate is formed by a sol-gel reaction. In yet another embodiment, the at least one alumino silicate is formed by a sol-gel reaction comprising TEOS and aluminum nitrate. In yet another embodiment, the at least one alumino silicate is formed from a mixture of sodium silicate and aluminum sulfate.

In another embodiment, the at least one metal compound is at least one zirconium silicate. In one embodiment, the starting materials for the at least one zirconium silicate comprise sodium silicate and zirconium sulfate. In another embodiment, the starting materials for the at least one zirconium silicate comprise sodium silicate and zirconium chloride. In a further embodiment, the starting materials for the at least one zirconium silicate comprise sodium silicate and ammonium zirconium carbonate. In yet another embodiment, the at least one zirconium silicate is formed by a sol-gel reaction. In yet a further embodiment, the at least one zirconium silicate is formed by a sol-gel reaction comprising TEOS and zirconium sulfate. In still another embodiment, the at least one zirconium silicate is formed from a mixture of sodium silicate and zirconium sulfate.

In a further embodiment, the at least one metal compound is at least one zinc silicate. In one embodiment, the starting materials for the at least one zinc silicate comprise TEOS and zinc nitrate. In another embodiment, the starting materials for the at least one zinc silicate comprise sodium silicate and zinc sulfate. In a further embodiment, the at least one zinc silicate is formed by a sol-gel reaction. In yet another embodiment, the at least one zinc silicate is formed by a sol-gel reaction comprising TEOS and zinc nitrate. In yet a further embodiment, the at least one zinc silicate is formed from a mixture of sodium silicate and zinc sulfate.

In one embodiment, the at least one metal compound comprises at least one metal component and at least one oxide component. In one embodiment, the metal compound is zirconium oxide. In another embodiment, the metal compound is zinc oxide. In another embodiment, the metal compound is aluminum oxide.

Coatings

The at least one coating may take various forms. In one embodiment, the at least one coating is in the form of a glassy-type coating. In another embodiment, the at least one coating is in the form of a ceramic-type coating. In still another embodiment, the coating is in the form of a sol-gel type coating.

The method of preparing the at least one metal compound and the method of applying the at least one metal compound to the at least one particulate mineral material are not critical, so long as at least one coating comprising the at least one metal compound is formed on the at least one particulate mineral material. In one embodiment, the starting materials of the at least one metal compound may be applied separately and directly to the particulate mineral material, forming a coating comprising at least one metal compound thereon. In another embodiment, the starting materials of the at least one metal compound are first mixed or reacted, and then applied to the at least one particulate mineral material to form at least one coating. In a further embodiment, the at least one metal compound or one or more starting materials of the at least one metal compound, including mixtures of starting materials, are applied to the at least one particulate mineral material by spraying onto the surface of the at least one particulate mineral material. In yet another embodiment, the at least one metal compound is applied to the at least one particulate mineral material by solution coating. In one embodiment, the solution coating is performed at or about room temperature (i.e., about 70° F.). In another embodiment, the solution coating is performed at a temperature less than about 300° F. In a further embodiment, the solution coating is performed at a temperature less than about 150° F.

In one embodiment in which the at least one particulate mineral material is perlite, the perlite may be coated with the at least one metal compound at any time during and/or after the perlite expansion process. In one such embodiment, the at least one metal component and the at least one other component of the at least one metal compound are applied separately and directly to the perlite during and/or after expansion of the perlite. In another such embodiment, the at least one metal component and the at least one other component may first be mixed or reacted and then applied to the perlite during and/or after expansion of the perlite.

In one embodiment, the at least one metal component and the at least one other component, either individually or as a mixture, are applied to the perlite while the perlite is at an elevated temperature relative to room temperature (e.g., 70° F.). In another embodiment, the at least one metal compound is applied to the perlite while it is undergoing expansion and it is at an elevated temperature. In a further embodiment, the at least one metal compound is applied to perlite after it has undergone expansion and while it is at an elevated temperature. For example, the elevated temperature may be from about 900° F. to about 1500° F. While not wishing to be bound by theory, forming the at least one coating in accordance with the embodiments in which the perlite is at an elevated temperature is believed to allow the metal compound to more easily precipitate onto the expanded perlite and/or to induce the formation of a ceramic coating. In addition, it is believed that coating in accordance with the embodiments in which the perlite is at an elevated temperature may facilitate the formation of a hard metal compound glass/ceramic coating on the surface of the substrate.

In a further embodiment, the at least one metal component and the at least one other component, either individually or a mixture, may be injected directly into the perlite expander. Once again, while not wishing to be bound by theory, it is contemplated that, to help reduce the production cost, a coating process according to this embodiment may be employed using existing expander equipment with no or minimum modification. In one such embodiment, the at least one metal compound and/or its starting materials is injected in-line into the perlite expander.

Properties

The coated particulate mineral materials of the present inventions may exhibit increased hardness, compressive strength, and/or improved coloration over particulate mineral materials that do not comprise at least one coating comprising at least one metal compound. In one embodiment, the particulate mineral materials of the present invention exhibit an increased compressive strength (as measured by compaction resistance). One example of a compaction resistance test measures the compressive force in $pd/in^2$ (psi) required to reduce a specified column of mineral aggregate by 1 or 2 inches. In one exemplary method to determine the compaction resistance, a Dillion $TC^2$ Tension Compression Cyclic machine may be used to test cylinders packed with the mineral material to be tested. First, test cylinders are prepared by packing the mineral to be tested into a test cylinder with 1⅛ inch inside diameter and 5 inch inside depth. The filled test cylinder is then held on the platform of a compaction density machine and bounced 25 times. After fitting a flanged collar on the test cylinder, more samples are added to bring the height to within an inch of the top of the collar. The filled test cylinder is then bounced for an additional 25 times. After removing the collar, the mineral above the level of the test cylinder was struck off with a straight edge. The cylinder with samples may then be weighed for a compaction density measurement, if desired. The cylinders are then transferred to the compaction resistance testing unit, where each cylinder is slowly compressed with a piston at a speed of 2 inch/min to the 1 inch or 2 inch mark. The resistance of the particulate material during the compaction can then be measured.

In one embodiment, the compressive strength is at least about 2 times that of the uncoated material. In another embodiment, the compressive strength is at least about 4 times that of the uncoated material. In a further embodiment, the compressive strength is at least about 6 times that of the uncoated material. In yet another embodiment, the compressive strength is at least about 10 times that of the uncoated material.

In one embodiment, the coated particulate mineral materials of the present inventions may exhibit increased hardness. The skilled artisan is aware of hardness attributes desirable for particulate mineral materials in an intended use or application. The hardness of particulate mineral materials may be difficult to measure directly. One exemplary method of those known to the skilled artisan for measuring hardness is a scrub resistance test according to ASTM D 2486-89. In one embodiment, the hardness of the coated particulate mineral material is increased by about 2%, according to its scrub resistance. In another embodiment, the hardness is increased by about 5%. In a further embodiment, the hardness is increased by about 10%. In yet another embodiment, the hardness is increased by about 15%. In yet a further embodiment, the hardness is increased by about 20% or more. In still another embodiment, the hardness is increased by about 2% to about 20%. In still a further embodiment, the hardness is increased by about 10% to about 20%.

In one embodiment, the coated particulate mineral materials of the present inventions may exhibit improved coloration. The skilled artisan is aware of coloration attributes desirable for particulate mineral materials in an intended use or application. The coloration of the coated particulate mineral materials may be evaluated using Hunter L, a, b color measurements collected, for example, on a Spectro/plus Spectrophotometer (Color and Appearance Technology, Inc., Princeton, N.J.). L, a, and b values rank the whiteness, red/green, and blue/yellow values spectrophotometrically by measuring the reflection of light off of a colored sample. The desired values for L, a, and b may be different for various particulate mineral materials and intended uses; values of L, a, and b may be considered independently from each other such that, for example, relatively small changes in one value (such as b) may be highly desirable even with relatively larger changes in another value (such as L). L is numbered between 0 and 100, with 0 being a completely black sample and 100 being a completely white sample. The a value is the red/green value which is a positive number for red samples (the more positive, the redder) and negative for green samples (the more negative, the greener). The b value is similar to the a but looks at the blue/yellow values of the material. Positive samples are yellow, negative samples are blue. The more positive or negative the number, the more yellow or blue, respectively. Blue light brightness ("BLB") may also be calculated from Hunter scale color data (L, a, b).

In one embodiment, the coated particulate mineral materials of the present invention have a b value closer to 0 than uncoated materials. In another embodiment, the coated particulate mineral materials have a b value about 1 unit lower than uncoated materials. In a further embodiment, the coated particulate mineral materials have a b value about 0.5 to about 2 units lower than uncoated materials. In yet another embodiment, the coated particulate mineral minerals have about the same L value as the uncoated materials. In yet a further embodiment, the coated particulate mineral materials have a b value closer to 0 than uncoated materials, with about the same L value. In still another embodiment, the coated particulate mineral materials have a b value closer to about 0 than uncoated materials, with a change in L value of about 4 units or less. In still a further embodiment, the coated particulate mineral materials have a b value about 0.5 units lower than uncoated materials, with a change in L value of about 4 units or less. In another embodiment, the coated particulate mineral materials have a b value of about 0.5 to about 2 units lower than uncoated materials, with a change in L value of about 0.2 to about 4 units. In a further embodiment, the coated particulate mineral materials have an a value within about 0.5 units of the uncoated materials.

Uses

The coated particulate mineral materials of the present invention may be used in many applications. For example, the coated particulate mineral materials may be used as pigments, fillers, proppants, or extenders in various materials such as paints, coatings, catalysts, stuccos, plastics, polymers, papers, potting compounds, spackling, tape joint compounds, concretes, plywood patches, resin based castings, water-based construction compounds, and sensitizers in blasting explosives. In one embodiment, the particulate mineral materials are used in paints (including but not limited to architectural, industrial, automotive, and maintenance paints) for, among other things, improved scrubablity, hardness, burnish, mar, and stain resistance, corrosion resistance, and abrasion resistance. In another embodiment, the coated particulate mineral materials are used in filter aid/filtration applications. In a further embodiment, the coated particulate mineral materials are used in insulation end uses for, among other things, increased reduced volume fill resistance and increased insulation behavior. In yet another embodiment, the coated particulate mineral materials are used in plywood patches for, among other things, cost reduction, sandability, and reduced shrinkage. In yet a further embodiment, the coated particulate mineral materials are used in polymer concretes for, among other things, higher compressive strength, cost reduction, reduced shrinkage, and improved flow. In still another embodiment, the coated particulate mineral materials are used in potting compounds for, among other things, thermal stress crack resistance and reduced shrinkage. In still a further embodiment, the coated particulate mineral materials are used in powder coatings for, among other things, abrasion resistance and improved flow. In another embodiment, the coated particulate mineral materials are used in spackling compounds for, among other things, improved sandability and reduced shrinkage. In a further embodiment, the coated particulate mineral materials are used in tape joint compounds for, among other things, improved sandability and reduced shrinkage.

In one embodiment, the coated particulate mineral materials are used in coatings. Exemplary coatings including, but are not limited to, architectural coatings, light industrial coatings, industrial coatings, decorative coatings, traffic paint coatings, automotive primer coatings, automotive top coatings, electro deposition primer ("EDP") coatings, cross-linkable lacquer coatings, electrostatic coatings, electrostatic lacquer coatings, high solid enamel coatings, low energy coatings (including two-component urethane coatings), powder coatings, radiation curable coatings, water reducible coatings, solventless coatings (including epoxy/curing agents), solventless primer coatings, elastomeric coatings, epoxy coatings (including urethane hybrid coatings, terrazzo coatings, and high heat system coatings), urethane and water-based coatings (including industrial & architectural polymer flooring coatings), wood coatings, self-leveling & trowelable surface coatings, chemical resistant coatings, traffic deck membrane system coatings, deck and dock stain and coating systems, bridge deck overlays, color driveway sealer, color roof repair coatings, pickup truck bed liner coatings, muffler repair coatings, ship deck coatings, concrete floor coatings, hockey stick tape coatings, workboot toe protection coatings, rust and corrosion preventative coatings, and anti-slip protection coatings.

In another embodiment, the coated particulate mineral materials are used in catalysts. Exemplary catalysts include, but are not limited to, acid catalysts (used, for example, in ammonia & methanol applications), amination catalysts (used, for example, in alcohol applications), ammonia synthesis catalysts (used, for example, in amine applications), methanol synthesis catalysts (used, for example, in carrier applications), custom manufactured catalysts (used, for example, in cyclohexane applications), dehydrogenation catalysts (used, for example, in diol and poliol applications), hydrogenation catalysts (used, for example, in flavor and fragrance applications), pre-reforming catalysts (used, for example, in feed purification applications), steam-reforming catalysts (used, for example, in ketone and alcohol applications), shift catalysts (used, for example, in nylon intermediate applications), sulfur catalysts (used, for example, in resin and wax applications), and chloride removal catalysts (used, for example, in oxidation and oxychlorination applications).

Other than in the examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations and, unless otherwise indicated, the numerical values set forth in the specific examples are reported as precisely as possible. Any numerical value, however, inherently contains certain errors necessarily resulting from the standard deviation found in their respective testing measurements.

By way of non-limiting illustration, examples of certain embodiments of the present disclosure are given below.

EXAMPLES

Example 1

An in-line coating process was used to coat Harborlite 50×50, a commercially available perlite filler product from World Minerals Inc., with at least one coating that comprises at least one alumino silicate. First, 200 pounds of sodium silicate (Brenntag N grade, $SiO_2/Na_2O=3.22$) was mixed with 250 pounds of water in a stainless steel container for 10 minutes. Next, 38 pounds of aluminum sulfate (Brenntag) was added to the solution. After mixing for 10 minutes, the solution was injected at 20 pds/min into a perlite expander in production of Harborlite 50×50. The injection point was located adjacent to the port for the thermocouple in the perlite expander (also called "in-line"). The temperature at the injection point was from 900° F. to 1100° F. The injection was started after 10 minutes of production of the control product (non-alumino silicate coated Harborlite 50×50). Samples were collected every 5 minutes. The first sample, consisting of the non-alumino silicate coated Harborlite 50×50 control material, was collected at time 0, just before the start of injection. Four additional samples, consisting of the alumino silicate coated material, were then collected at times 5 min, 10 min, 15 min, and 20 min. A total of 684 pounds of coated product was produced during the run.

As shown in Table 1, the alumino silicate glass/ceramic coating clearly and unexpectedly improved the compaction resistance of the Harborlite 50×50.

TABLE 1

Compaction Density and Resistance of Alumino silicate Glass/Ceramic Coated Perlite

| Sample ID | Compaction Density (pd/cf) | 1-Inch Compaction Resistance (psi) | 2-Inch Compaction Resistance (psi) |
| --- | --- | --- | --- |
| Non-Al—Si Coated Harborlite 50 × 50 (control), 0 min | 3.1 | 10.4 | 35.3 |
| Al—Si Coated Harborlite 50 × 50, 5 min | 3.5 | 16.5 | 47.0 |
| Al—Si Coated Harborlite 50 × 50, 10 min | 3.3 | 15.5 | 45.5 |
| Al—Si Coated Harborlite 50 × 50, 15 min | 2.9 | 12.8 | 36.4 |
| Al—Si Coated Harborlite 50 × 50, 20 min | 3.2 | 14.0 | 42.2 |

The methods used for determining the strength and hardness of the perlite material presented in Table 1 were a compaction density test and a compaction resistance test. In the compaction density test, the perlite to be tested was packed into a test cylinder with 1⅞ inch inside diameter and 5 inch inside depth. The filled test cylinder was then held on the platform of a compaction density machine and bounced 25 times. After fitting a flanged collar on the test cylinder, more samples were added to bring the height to within an inch of the top of the collar. The filled test cylinder was then bounced for an additional 25 times. After removing the collar, the perlite above the level of the test cylinder was struck off with a straight edge. The cylinder with samples was then weighed for a compaction density measurement.

To determine the compaction resistance, a Dillion $TC^2$ Tension Compression Cyclic machine was used to test cylinders packed with the perlite produced according to this example. During the test, the cylinder was slowly compressed with a piston at a speed of 2 inch/min to the 1 inch or 2 inch mark. The resistance of the particulate material during the compaction was measured.

It is believed that the slight downward trend in density and compaction resistance of the coated particulate material was due to a gradual increase in the homogeneity of the Al—Si coatings formed on the samples. This homogeneity was most likely caused by large agglomerated/melted chunk material that built up in the expander after expansion. It is believed that the Al—Si solution was concentrated on some spots in the expander at the end of the expansion, thus resulting in an Al—Si coating on the substrate that gradually became thinner and thinner, thereby gradually decreasing the density and compaction resistance of the samples.

Example 2

An expanded perlite microsphere product different from Example 1 was used as the substrate for an alumino silicate glass/ceramic coating. Prior to coating, the non-coated alumino silicate perlite microsphere product was measured to have an average particle size of 46 microns, a 1-inch compaction resistance of 22 psi, and a compaction density of 9.1 lb/cf. FIG. 1 shows the scanning electron micrograph of this starting, non-coated sample.

To coat the starting perlite microsphere product, first, 20 grams of sodium silicate solution (PQ Corporation N® 38, $SiO_2/Na_2O=3.22$) was mixed with 10 grams of water for 10 minutes. Second, 1 gram of aluminum sulfate (Alfa Aesar, $Al_2(SO_4)_3 \cdot XH_2O$, X≈14-18) was added to the silicate solution. That solution was mixed for another 10 minutes. Next, the solution was sprayed onto 80 grams of the substrate perlite microspheres. After drying overnight in the air, the alumino silicate glass/ceramic coated sample was tested for compaction resistance as stated in Example 1. This alumino silicate glass/ceramic coated sample had a 1-inch compaction resistance of 44 psi and a compaction density of 9.4 lb/cf.

In practice, it is often times desirable to obtain a product that exhibits higher strength at lower densities. In general, a thicker coating yields a larger or greater increase in compaction density. Since only a relatively small sample of expanded perlite microspheres was used in this Example 2, as compared with Example 1, it is believed that a greater percentage of the expanded perlite microspheres were substantially fully coated, thus leading to a higher degree of homogeneity than in that Example 1. Notably, while the applied alumino silicate coating was not thick enough to significantly increase the compaction density of the expanded perlite microsphere sample, it did result in greatly and unexpectedly improved strength characteristics, as measured by compaction resistance.

Example 3

Example 2 was repeated except that 60 g of the perlite microspheres were used. The alumino silicate glass/ceramic coated sample had a 1-inch compaction resistance of 51 psi and a compaction density of 9.8 lb/cf, measured by the techniques used in Example 1. The Al—Si to substrate ratio in Example 2 increased to 21:60 from 21:80 in Example 1. It is believed that this Example 3 resulted in a thicker coating than in Example 2 and lead to both a higher compaction density and a higher compressive strength, as measured by compaction resistance.

Example 4

Samples of perlite microspheres were coated with alumino-silicate coatings according to the present invention to evaluate the increase in compaction density and compaction resistance. Samples of commercially available perlite microspheres, Harborlite PA1000 and Harborlite PA116 (from World Minerals Inc.) were coated with an alumino silicate coating. The alumino silicate coating comprised aluminum sulfate and sodium silicate. For coating the Harborlite PA1000 samples, the sodium silicate to aluminum sulfate ratio in the coating solution was fixed at 20, and the coating solution to perlite microsphere ratio was varied from 0.3 to 2. For coating the Harborlite PA116 samples, the sodium silicate to aluminum sulfate ratio in the coating solution was varied from 5 to 60, and the coating solution to perlite microsphere ratio was fixed at 1.

To coat the perlite microsphere samples, first, the desired amount of sodium silicate solution (PQ Corporation N® 38, $SiO_2/Na_2O=3.22$), reflected in Table 2 below, was mixed with 10 grams of water for 10 minutes. Next, the desired amount of aluminum sulfate (Alfa Aesar, $Al_2(SO_4)_3 \cdot XH_2O$, $X \approx 14\text{-}18$), reflected in Table 2 below, was added to the silicate solution. That solution was mixed for another 10 minutes. The solution was then sprayed onto the specified amount of the substrate perlite microspheres, as reflected in Table 2 below. After drying overnight in the air, the aluminosilicate glass/ceramic coated samples were tested for compaction density and resistance.

Figure 7:
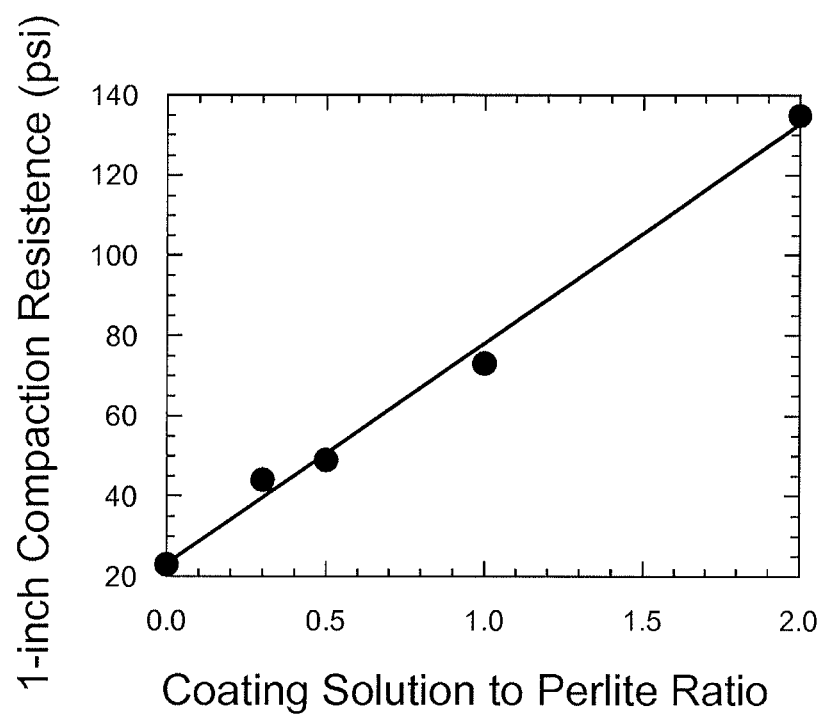
FIG. 7 depicts the relationship between the coating solution to perlite ratio and 1-inch compaction resistance of perlite microspheres tested according to Example 4.

Compaction density and 1-inch compaction resistance of the uncoated perlite materials were measured as stated in Example 1 and compared with the compaction density and 1-inch compaction resistance of the same material after coating with an alumino silicate coating in accordance with the present invention. In addition, the ratio of aluminum compound to silicate compound and alumino silicate coating solution to perlite material were varied in order to evaluate the impact of those concentrations on the same parameters. Finally, for purposes of comparison, three additional uncoated glass microsphere products, 3M Company's Scotchlite glass bubble K-1, K-15, and S-22, were also evaluated to determine their compaction density and 1-inch compaction resistance. The results of those tests are shown in Table 2 below.

became thicker with larger amount of coating solution, thus leading to higher strength. This relationship from the above testing is depicted in FIG. 7.

Figure 8:
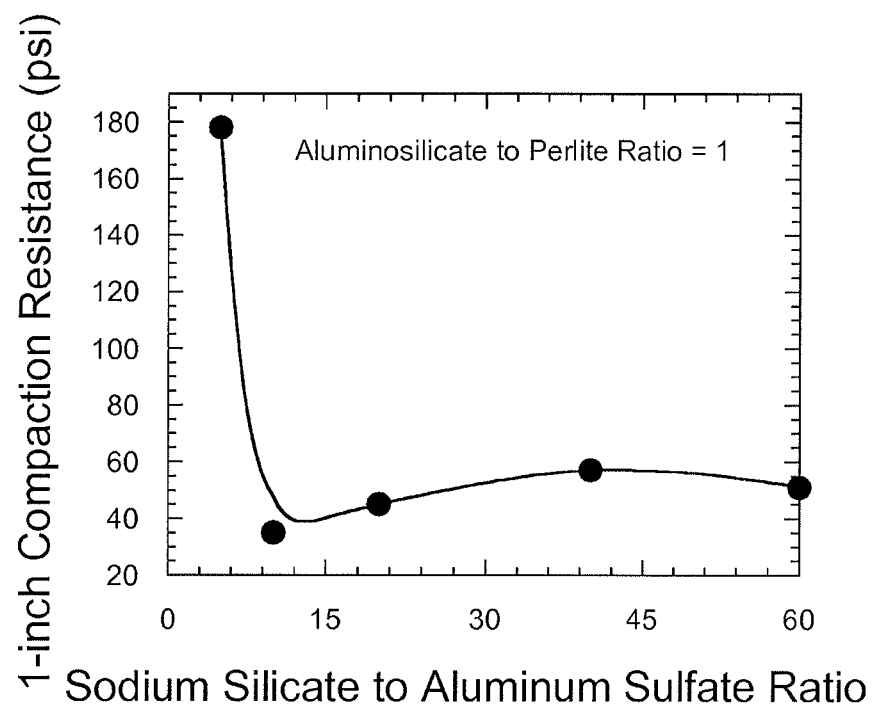
FIG. 8 depicts the relationship between the sodium silicate to aluminum sulfate ratio and 1-inch compaction resistance of perlite microspheres tested according to Example 4, with an aluminosilicate to perlite ratio of 1.

In addition, at an alumino silicate to perlite ratio of 1, higher strength was observed at low silicate to aluminum ratio (<5), while higher silicate to aluminum ratio (>5) had no significant impact on the strength. This relationship from the above testing is depicted in FIG. 8. Moreover, as compared to the commercial glass microsphere samples K-1, K-15, and S-22, the testing results also demonstrate that the strength for the aluminosilicate coated perlite microspheres according to the present invention were at least comparable to that of the commercial products.

Example 5

In Example 5, samples of perlite microspheres were coated with zirconium silicate coatings according to the present invention to evaluate the increase in compaction density and compaction resistance. Samples of Harborlite PA116, available from World Minerals Inc., were used for the samples of perlite microspheres. To coat the perlite microsphere samples, first, the desired amount (17 to 40 grams as reflected in Table 3 below) of sodium silicate solution (PQ Corporation N® 38, $SiO_2/Na_2O=3.22$) was mixed with desired amount (17 to 33 grams as reflected in Table 3 below) of zirconium sulfate solution (Aldrich, $Zr(SO_4)_2$, 35%) for 10 minutes. In some cases, additional water was also added into the solution. Next, the solution was sprayed onto the desired amount of the substrate perlite microspheres as reflected in Table 3 below.

TABLE 2

Compaction Density and Resistance of Alumino Silicate Coated Perlite Microspheres

| Sample ID | $Na_2SiO_3/$ $AL_2(SO_4)_3 \times H_2O$ Ratio | Al—Si solution/ Perlite Ratio | Compaction Density (lb/cf) | 1-Inch Compaction Resistance (psi) |
|---|---|---|---|---|
| 3M K-1 (control) | | | 5.7 | 57 |
| 3M K-15 (control) | | | 6.6 | 74 |
| SM S-22 (control) | | | 8.6 | 125 |
| PA1000 (control) | | | 11.4 | 23 |
| Al—Si coated PA1000 | 20 | 2 | 15.0 | 135 |
| Al—Si coated PA1000 | 20 | 1 | 14.5 | 73 |
| Al—Si coated PA1000 | 20 | 0.5 | 12.0 | 49 |
| Al—Si coated PA1000 | 20 | 0.3 | 11.0 | 44 |
| PA116 (control) | | | 10.2 | 20 |
| Al—Si coated PA116 | 5 | 1 | 14.6 | 178 |
| Al—Si coated PA116 | 10 | 1 | 10.7 | 35 |
| Al—Si coated PA116 | 20 | 1 | 11.5 | 45 |
| Al—Si coated PA116 | 40 | 1 | 12.1 | 57 |
| Al—Si coated PA116 | 60 | 1 | 11.4 | 51 |

As can be seen from Table 2, the samples of perlite microspheres coated with the metal silicate (alumino silicate) coatings according to the present invention exhibited a marked increase in 1-inch compaction resistance, with minimal effect on compaction density as compared to the uncoated control samples. In addition, it can be seen that increasing the ratio of alumino silicate coating to perlite material had a minimal effect on compaction density, while compressive strength (as measured by compaction resistance) was dramatically increased.

The results demonstrate that compaction resistance increased linearly with increasing coating solution to perlite ratio. Without wishing to be bound by theory, it is believed that the coating layer on the perlite microsphere surface After drying overnight in the air, the aluminosilicate glass/ceramic coated samples were tested for compaction resistance and density using the techniques of Example 1.

Measurements of the compaction density and 1-inch compaction resistance of the uncoated perlite materials was measured and compared with the compaction density and 1-inch compaction resistance of the same material after coating with a zirconium silicate coating in accordance with the present invention. In addition, the ratio of zirconium compound to silicate compound and zirconium silicate coating to perlite material were varied in order to evaluate the impact of those concentrations on the same parameters. The results of those tests is shown in Table 3 below.

TABLE 3

Compaction Density and Resistance of Zirconium Silicate Coated Perlite

| Perlite (g) | $H_2O$ (g) | $Zr(SO_4)_2$ (g) | $Na_2SiO_3$ (g) | $Na_2SiO_3/Zr(SO_4)_2$ Ratio | Zr-Si Solution/Perlite Ratio | Loose Weight Density (lb/cf) | Compaction Density (lb/cf) | 1-Inch Compaction Resistance (psi) |
|---|---|---|---|---|---|---|---|---|
| Control (PA116) | | | | | | 8.9 | 10.2 | 10 |
| 50 | 0 | 23 | 17 | 0.7 | 1 | 10.8 | 12.6 | 18 |
| 50 | 0 | 25 | 25 | 1 | 1 | 12.6 | 14.7 | 71 |
| 50 | 0 | 17 | 33 | 1.9 | 1 | 12.8 | 15.5 | 100 |
| 50 | 10 | 7 | 33 | 4.7 | 0.8 | 9.8 | 11.6 | 29 |
| 50 | 10 | 10 | 30 | 3.0 | 0.8 | 11.6 | 13.6 | 85 |
| 50 | 10 | 15 | 25 | 1.7 | 0.8 | 11.7 | 13.8 | 78 |

As can be seen from Table 3, the zirconium silicate coated perlite samples exhibited a dramatic increase in compressive strength as compared with the uncoated perlite sample, while only a slight increase in compaction density. In addition, as the ratio of zirconium silicate coating to perlite material was increased, the compaction resistance was also increased. The tested samples were found to exhibit the greatest strength at a $Na_2SiO_3/Zr(SO_4)_2$ ratio between 1 to 3.

Example 6

In Example 6, samples of diatomite were coated with various metal silicate coatings to evaluate their increase on scrub resistance. Samples of CelTix diatomite, available from World Minerals Inc., were treated with the various coatings. The diatomite samples were coated with zirconium silicate and boron-silicate coatings according to the present invention and compared with an uncoated diatomite sample and samples of diatomite coated with an ammonium zirconium carbonate (Zr(AZC)) coating not in accordance with the present invention.

To coat the CelTix, first, the desired amount of ammonium zirconium carbonate solution (Aldrich, $(NH_4)ZrO(CO_3)_2$, 14-16% Zr as reflected in Table 4 below) was mixed with 20 g of water for 10 minutes. Next, the solution was sprayed onto 200 g of CelTix. After drying at 120° C. overnight in the air, the ammonium zirconium carbonate coated samples were tested for scrub resistance.

CelTix was also coated with zirconium silicate using zirconyl chloride and ammonium zirconium carbonate as the starting materials. For zirconyl chloride coating, first, 3 grams of sodium silicate solution (PQ Corporation N® 38, $SiO_2/Na_2O=3.22$) was mixed with 15 grams of water for 10 minutes. Second, 6 grams of zirconyl chloride solution (Aldrich, $ZrOCl_2$, 30%) was mixed with 15 g of water for 10 minutes and then added to the sodium silicate solution. Next, the Zr—Si coating solution was sprayed onto 200 g of CelTix. After drying at 120° C. overnight in the air, the zirconium silicate coated samples were tested for scrub resistance. For ammonium zirconium carbonate coating, first, 5 grams of sodium silicate solution (PQ Corporation N® 38, $SiO_2/Na_2O=3.22$) was mixed with 30 grams of water for 10 minutes. Second, 40 grams of ammonium zirconium carbonate solution (Aldrich) was mixed with 20 g of water for 10 minutes and then added to the sodium silicate solution. Next, the Zr—Si coating solution was sprayed onto 200 g of CelTix. After drying at 120° C. overnight in the air, the zirconium silicate coated sample was tested for scrub resistance.

To coat the CelTix samples with borosilicate, first, the desired amount (2-5 grams) of sodium silicate solution (PQ Corporation N® 38, $SiO_2/Na_2O=3.22$) was mixed with 10 grams of water for 10 minutes. Second, desired amount (5-10 grams) of ammonium pentaborate octahydrate (Aldrich, $(NH_4)_2B_{10}O_{16} \cdot 8H_2O$, >99%) was mixed with desired amount (3-45 grams) of water for 10 minutes and then added to the sodium silicate solution. The ammonium pentaborate octahydrate to sodium silicate ratio was varied from 1 to 5. Next, the borosilicate coating solution was sprayed onto 200 g of CelTix. After drying at 120° C. overnight in the air, the borosilicate coated samples were tested for scrub resistance. The scrub resistance of the uncoated diatomite material and ammonium zirconium carbonate coated diatomite materials were measured and compared with the scrub resistance of the same material coated with zirconium silicate and boron-silicate coatings in accordance with the present invention. The results of those tests are shown in Table 4 below.

TABLE 4

Scrub Resistance of Metal Silicate Coated Diatomite

| Sample ID | % Increase of Scrub Resistance |
|---|---|
| CelTix (control) | 0 |
| 12% $(NH_4)ZrO(CO_3)_2$ coated CelTix | −12 |
| 24% $(NH_4)ZrO(CO_3)_2$ coated CelTix | 14 |
| Zirconium silicate coated CelTix ($ZrOCl_2$ to $Na_2SiO_3$ ratio of 2) | 12 |
| Zirconium silicate coated CelTix (($NH_4)ZrO(CO_3)_2$ to $Na_2SiO_3$ ratio of 8) | 17 |
| Borosilicate coated CelTix (($NH_4)_2B_{10}O_{16}$ to $Na_2SiO_3$ ratio of 2) | 14 |
| Borosilicate coated CelTix (($NH_4)_2B_{10}O_{16}$ to $Na_2SiO_3$ ratio of 1) | 7 |
| Borosilicate coated CelTix (($NH_4)_2B_{10}O_{16}$ to $Na_2SiO_3$ ratio of 5) | 2 |

As can be seen from Table 4, each of the samples treated with the coatings according to the present invention exhibited increased scrub resistance as compared to the uncoated control sample, regardless of the loading concentration. In contrast, meaningful improvement on scrub resistance within testing parameters for the ammonium zirconium carbonate coating was only seen at a loading of 24%. In addition, scrub resistance improvement was seen for the zirconium silicate coatings regardless of the zirconium compound starting material (17% improvement for the ammonium zirconium carbonate starting material and 12% for the zirconyl chloride).

Example 7

In Example 7, samples of diatomite were coated with zinc oxide coatings to evaluate their change in coloration. Seven samples of CelTix diatomite, available from World Minerals Inc., were treated with the zinc oxide coatings in various weight percentages, at various temperatures, and for various particle sizes of the base diatomite material as reflected in Table 5 below. To coat the CelTix with zinc oxide, the desired amount (6-24 grams as reflected in Table 5 below) of zinc sulfate (Mallinckrodt, $ZnSO_4 \cdot 7H_2O$, 99.3%) was mixed with 20 g of water for 10 minutes, and then the solution at about room temperature was sprayed onto 200 g of CelTix. The coated samples were then dried at 120° C. overnight in the air. As reflected in Table 5, many of the dried samples were additionally heat-treated at 300° C. for 15 minutes. The coloration of the resultant zinc oxide coated diatomite materials were evaluated for improved coloration using Hunter L, a, b color measurements collected on a Spectro/plus Spectrophotometer (Color and Appearance Technology, Inc., Princeton, N.J.). The coated samples were then compared to the uncoated control sample. The results of those tests are shown in Table 5 below.

TABLE 5

Improved Coloration of Zinc Oxide Coated Diatomite

| Celtix (g) | $Zn(SO_4)$ (g) | Drying/heat-treatment Temperature (° C.) | d10 | d50 | d90 | L | a | b | Blue Light Brightness |
|---|---|---|---|---|---|---|---|---|---|
| Control | | | 4.91 | 13.57 | 28.78 | 93.16 | 0.20 | 4.53 | 80.76 |
| 200 | 6 | 120 | 4.86 | 13.35 | 30.61 | 92.72 | 0.59 | 3.46 | 81.39 |
| 200 | 6 | 300 | 4.57 | 13.47 | 31.72 | 90.14 | 0.36 | 3.45 | 76.81 |
| 200 | 12 | 120 | 4.67 | 13.09 | 29.98 | 92.48 | 0.36 | 3.47 | 80.94 |
| 200 | 12 | 300 | 4.58 | 13.51 | 32.04 | 89.55 | 0.17 | 2.92 | 76.46 |
| 200 | 24 | 120 | 4.76 | 12.70 | 28.85 | 91.81 | 0.29 | 3.15 | 80.16 |
| 200 | 24 | 300 | 4.58 | 13.44 | 32.41 | 89.53 | 0.19 | 2.69 | 76.72 |

As can be seen from the results in Table 5, the diatomite samples coated with the zinc oxide coating exhibited unexpected and desirable reduction in yellowness (b value). In general, yellowness is not found to be desirable for many filler applications. The heat-treatment at 300° C. was also found to further reduce yellowness. Decreases in brightness (L value) were acceptable given the decrease in yellowness, as were decreases in blue light brightness, as overall the dried as well as the heat treated samples still exhibited improved coloration.

Other embodiments of this invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of forming coated expanded perlite, comprising:
    introducing unexpanded perlite into an expander operating at an elevated temperature;
    injecting into the expander at least one metal component and at least one silicate component; and
    allowing the perlite, the at least one metal component, and the at least one silicate component to reside in the expander for a time sufficient to expand the perlite and to coat the expanded perlite with at least one metal silicate derived from the reaction of the at least one metal component and the at least one silicate component.

2. The method of claim 1, wherein the at least one silicate component is chosen from the group consisting of tetraethylorthosilicate, tetramethylorthosilicate, sodium silicate, alkali silicate, colloidal silica, solid silica, alkaline metal silicates, and sodium metasilicate.

3. The method of claim 1, wherein the at least one metal component is chosen from the group consisting of metal nitrates, metal sulfates, metal aluminates, sodium metals, metal chlorides, metal alkoxides, metal acetates, metal formates, bayerite, pseudoboehmite, gibbsite, colloidal metals, metal gels, metal sols, metal trichlorides, ammonium metal carbonates, metal hydrates, and metal chlorohydrates.

4. The method of claim 1, wherein the at least one metal component comprises at least one of aluminum, zirconium, boron, and zinc.

5. The method of claim 1, wherein the at least one metal component is chosen from aluminum nitrate, aluminum sulfate, sodium aluminate, and aluminum halides.

6. The method of claim 1, wherein the at least one metal component is chosen from zirconium sulfate, zirconium chloride, ammonium pentaborate octahydrate, and ammonium zirconium carbonate.

7. The method of claim 1, wherein the at least one metal component is chosen from zinc sulfate and zinc nitrate.

8. The method of claim 1, wherein the at least one metal silicate comprises an alumino silicate.

9. The method of claim 1, wherein the at least one metal silicate is chosen from at least one of a zirconium silicate and a zinc silicate.

10. The method of claim 1, wherein the at least one metal component is sodium aluminate, and the at least one silicate component is sodium silicate.

11. The method of claim 1, wherein the at least one metal component and at least one silicate component are injected into the expander during expansion of the perlite.

12. The method of claim 1, wherein the at least one metal component and at least one silicate component are injected into the expander after expansion of the perlite.

13. The method of claim 1, wherein the expanded perlite comprises perlite microspheres.

14. The method of claim 1, wherein the elevated temperature ranges from about 900° F. to about 1500° F.

15. The method of claim 1, wherein the elevated temperature ranges from about 900° F. to about 1100° F.

16. A method of forming coated expanded perlite, comprising:
    introducing unexpanded perlite into an expander operating at an elevated temperature;
    injecting into the expander sodium aluminate and sodium silicate; and allowing the perlite, the sodium aluminate, and the sodium silicate to reside in the expander for a time sufficient to expand the perlite and to coat the expanded perlite with at least one aluminosilicate.

17. The method of claim 16, wherein the expanded perlite comprises perlite microspheres.

18. The method of claim 16, wherein the sodium aluminate and sodium silicate are injected into the expander during expansion of the perlite.

19. The method of claim 16, wherein the sodium aluminate and sodium silicate component are injected into the expander after expansion of the perlite.

20. The method of claim 16, wherein the elevated temperature ranges from about 900° F. to about 1500° F.

21. The method of claim 16, wherein the elevated temperature ranges from about 900° F. to about 1100° F.

* * * * *